Feb. 27, 1962 G. I. WELTER 3,023,018
CART SEAT
Filed Aug. 3, 1960 3 Sheets-Sheet 1
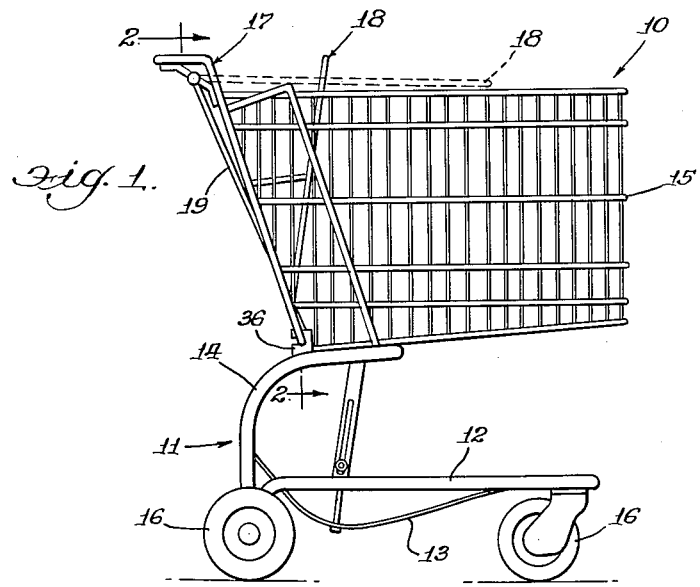
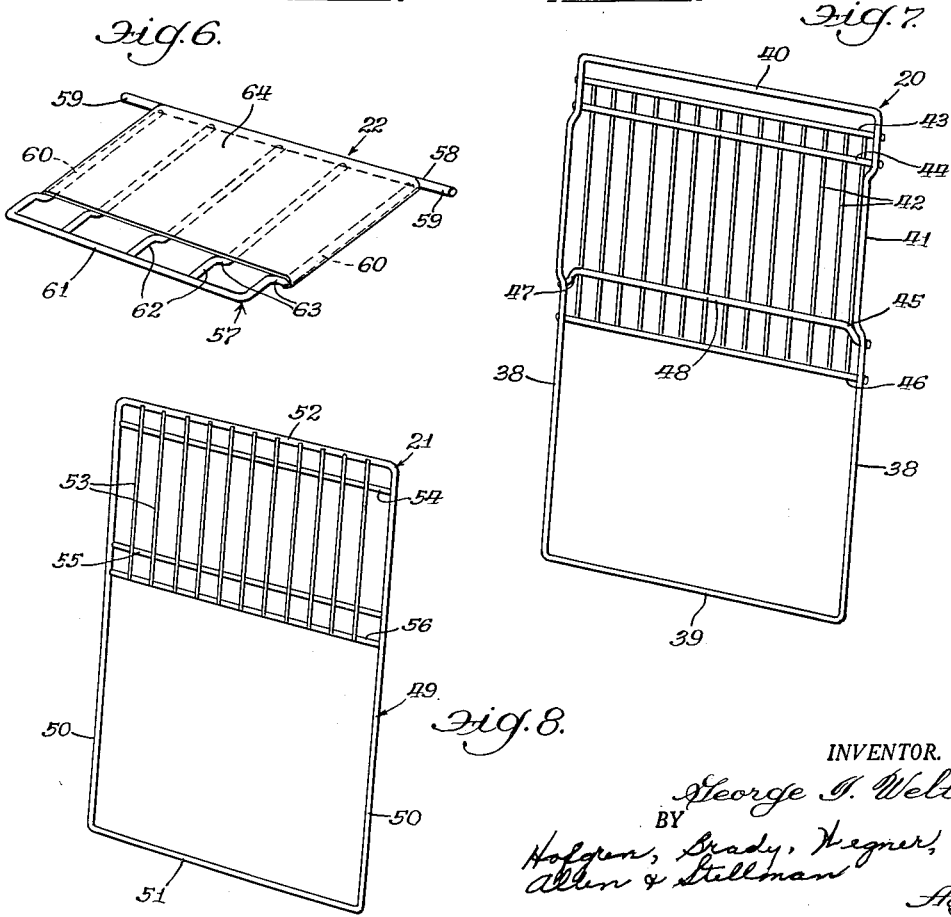
INVENTOR.
George I. Welter
BY
Holgren, Brady, Wegner,
Allen & Stellman
Attys.

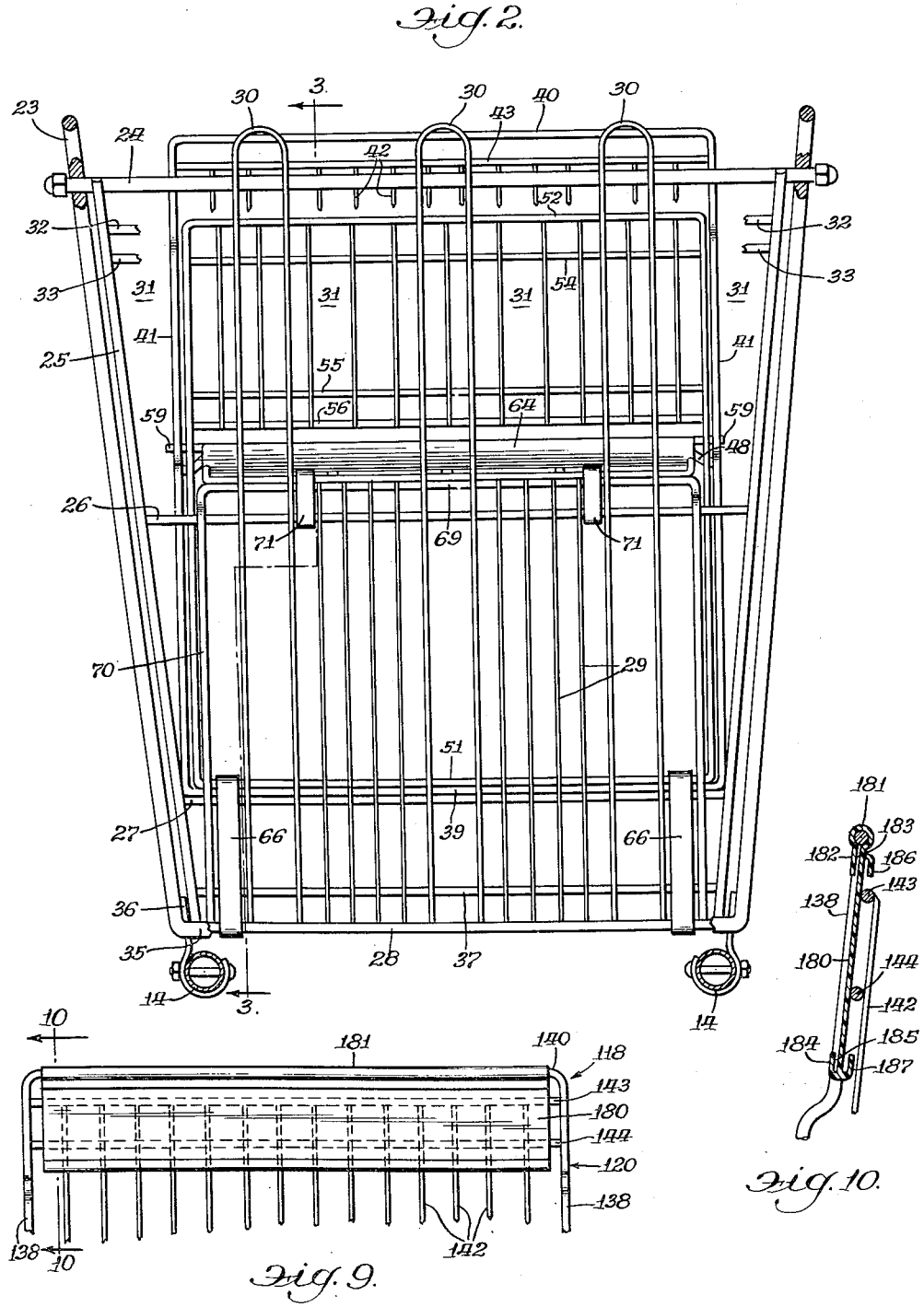

Feb. 27, 1962  G. I. WELTER  3,023,018
CART SEAT
Filed Aug. 3, 1960  3 Sheets-Sheet 3
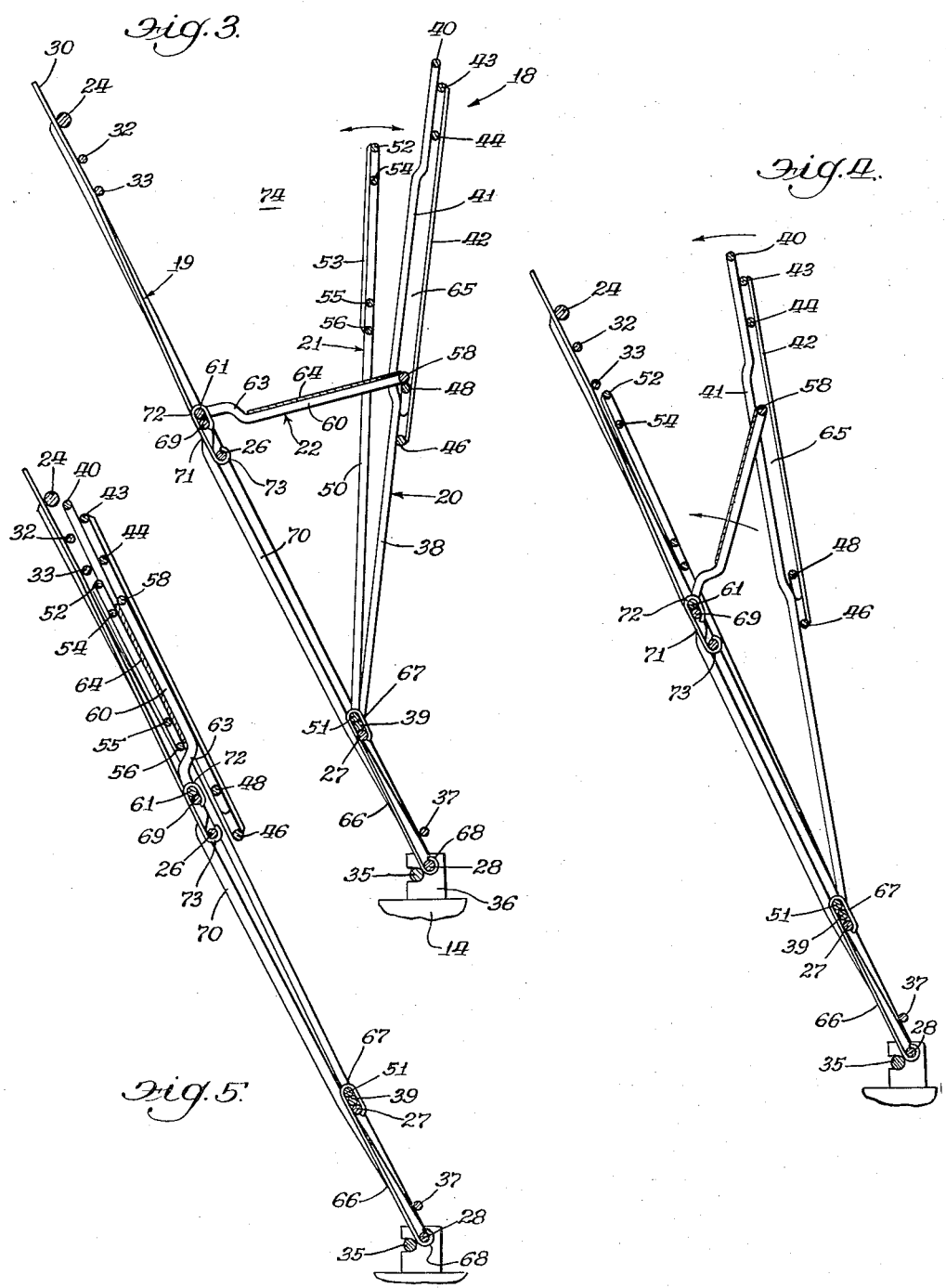

United States Patent Office 3,023,018
Patented Feb. 27, 1962

3,023,018
CART SEAT
George I. Welter, Chicago, Ill., assignor to
Harold I. Sides
Filed Aug. 3, 1960, Ser. No. 47,186
8 Claims. (Cl. 280—33.99)

This invention relates to carts such as grocery carts and the like, and in particular to seat structures for use in such carts.

In the modern grocery carts such as used in self-service supermarkets, provision is made for telescopically nesting the carts for effectively minimizing the storage space requirements thereof. Further, such modern carts are provided with seat structures for supporting small children. Such seat structures are preferably collapsible to permit use of the cart selectively as a single large merchandise receiving receptacle or with the seat structure extended to utilize a portion of the space within the basket separately from the remainder thereof. The portion of the space separated by the seat structure from the remainder is sufficient to accommodate a small child or a number of small packages. To accommodate the child, the rear gate of the cart basket is provided with a pair of leg openings permitting the child's legs to extend rearwardly from the seat structure subjacent the cart handle. When the separated space is to be used for holding small packages, it is desirable to close the leg openings to preclude inadvertent falling of the packages therethrough.

The present invention is concerned with such a collapsible seat structure including means for selectively closing the leg openings of the basket rear gate. It is a principal object of the present invention, therefore, to provide a new and improved cart seat structure.

Another object of the invention is to provide such a cart seat structure having new and improved means for selectively closing the leg openings of the rear gate.

A further object of the invention is to provide such a cart seat structure arranged for facilitated, compact nesting in the collapsed arrangement.

Still another object of the invention is to provide such a cart seat wherein the leg opening closure is arranged for selective reinforcement of the seat back.

A yet further object of the invention is to provide such a cart seat structure having new and improved means providing an upward extension of the seat back.

Still another object of the invention is to provide such a cart seat structure wherein the seat back extension is arranged to carry indicia to be viewed by the person pushing the cart.

Other features and advantages of the invention will be apparent from the following description taken in connection with the accompanying drawing wherein:

FIG. 1 is a side elevation of a grocery cart provided with a seat structure embodying the invention;

FIG. 2 is a enlarged fragmentary rear elevation, partly in section, of the cart taken substantially along the line 2—2 of FIG. 1;

FIG. 3 is a vertical section taken substantially along the line 3—3 of FIG. 2 with the seat structure elements in an open arrangement;

FIG. 4 is a view generally similar to FIG. 3 but with the seat structure elements in a partially collapsed arrangement;

FIG. 5 is a view generally similar to FIG. 4 but with the seat structure elements in a collapsed arrangement;

FIG. 6 is a perspective view of the seat element;

FIG. 7 is a perspective view of the front panel;

FIG. 8 is a perspective view of the intermediate panel;

FIG. 9 is an enlarged fragmentary elevation of another form of front panel provided with a plate for carrying indicia; and FIG. 10 is a vertical section taken substantially along the line 10—10 of FIG. 9.

In the exemplary embodiment of the invention as disclosed in FIGS. 1–8 of the drawing, a grocery cart generally designated 10 includes a base structure generally designated 11 including a lower frame member 12 carrying a platform 13, and an upper frame member 14 carrying a basket 15. Suitable wheels 16 are provided on the base structure 11 and a handle structure 17 is associated with the base structure 11 for facilitating movement of the cart.

The present invention comprehends an imroved seat structure 18 in cart 10. More specifically, the seat structure 18 includes a rear gate 19 of basket 15, a front panel 20, an intermediate panel 21, and a seat 22 operatively associated at the rear of basket 15 adjacent handle structure 17. Rear gate 19 is pivotally mounted on a support portion 23 of handle structure 17 by means of a transverse pivot rod 24 at the upper end of a frame 25 thereof. A transverse rod 26 extends across the mid-portion of frame 25 and a lower, transverse support rod 27 extends across the frame a small distance above the lower end 28 thereof. The lower end of the gate 19 is effectively closed by a plurality of vertically extending wires 29 extending from the lower frame end 28 to slightly above the transverse rod 26. A plurality of elongated hairpin-shaped wire elements 30 extend upwardly from frame end 28 to terminate slightly above pivot rod 24 adjacent handle 17 and are laterally spaced to define openings 31 for extension of a child's legs rearwardly therethrough. In the illustrated embodiment, three such hairpin-shaped wire elements 30 are provided defining two pairs of leg openings 31 to accommodate selectively two children in side-by-side relationship on the seat 18 or one child seated in the center of the seat 18. A pair of cross rods 32 and 33 extend across the frame slightly below the pivot rod 24, the lower cross rod 33 defining the upper end of the leg openings 31.

As shown in FIG. 1, the rear gate 19 may be swung forwardly and upwardly to a generally horizontal position adjacent the top of basket 15 permitting the telescoped association of a plurality of such carts. As the front panel 20, the intermeidate panel 21, and the seat 22 are carried on the rear gate, the entire assembly thereof generally designated 18 may be thusly swung to the upper, telescoping position. When the telescoped carts are separated, the assembly 18 pivots downwardly to the full line position of FIG. 1 wherein the lower end 28 of rear gate 19 abuts a transverse lower end rod 35 of the handle support 23 which is carried on a pair of clips 36 secured to the base structure portion 14. For facilitated manufacture, the wires 29 may be terminated short of the frame end 28 and secured to a lower cross rod 37 secured at its ends to frame 25 slightly above the end 28.

As best seen in FIG. 7, front panel 20 includes an outer rectangular frame defined by a pair of elongated side rod elements 38, a bottom rod element 39, and a top rod element 40. Each of the side elements 38 is provided with a rearwardly offset portion 41 spaced a short distance below the upper rod element 40. A plurality of vertically extending wires 42 substantially close the upper portion of the front panel being secured at their upper ends to a pair of cross rods 43 and 44, and at their lower ends to a pair of cross rods 45 and 46, each of the cross rods being secured at their ends to the front side of the frame side rod elements 38. Cross rod 45, as best seen in FIG. 7, is provided with downturned ends 47 permitting the transverse portion 48 thereof to lie substantially in the horizontal plane of the lower end of the offset portion 41 of the side rod elements 38.

Intermediate panel 21, as best seen in FIG. 8, includes a rectangular frame 49 including a pair of side rod elements 50, a bottom rod element 51, and a top rod element 52. A plurality of vertically extending wires 53 define an upper closure portion of the intermediate panel, the upper ends of the wires 53 being secured to the upper rod element 52 and a cross rod 54 spaced a small distance below the rod element 52, and the lower ends of the wires 53 being secured to a pair of cross rods 55 and 56.

Seat 22 includes a frame 57 having a front rod element 58 provided with laterally projecting ends 59, a pair of side rod elements 60 and a rear rod element 61. Three parallel laterally spaced reinforcing rod elements 62 are disposed intermediate the side rod elements 60, extending from front rod element 58 to rear rod element 61. Each of the side rod elements 60 and the reinforcing rod elements 62 is provided with an offset 63 to permit a seat panel 64 carried on the rod elements 58, 60 and 62 to lie flat against cross rods 54, 55 and 56 of intermediate panel 21 when the seat structure 18 is disposed in the collapsed position of FIG. 5. As best seen in FIG. 3, the extensions 59 of the front rod 58 are slidable against the forward surface of the offset portion 41 of the side rod elements 38 of the front panel 20, the downward movement of the seat 22 being limited by the engagement of the front rod element 58 with the cross rod 45 of front panel 20. As the transverse portion 48 of the cross rod 45 is aligned with the lower end of the offset portion 41 of the side rod elements 38, the rod element 58 is precluded from binding at the lower end of the offset portion 41 between the offset portion and the vertical wires 42. It should be noted that the offset portion 41 co-operates with the upright wires 42 to define a channel 65 through which the front rod element 58 may move as the seat is swung up and down between the positions of FIG. 3 and FIG. 5.

As best seen in FIGS. 2 and 3, the lower rod element 39 of the front panel 20 and the lower rod element 51 of the intermediate panel 21 are pivotally connected to the transverse rod 27 by means of a pair of brackets 66 each having an upper looped end 67 secured about the rod elements 27, 39 and 51 and a lower looped element 68 secured about the frame end 28 of gate 19. The rear rod element 61 of seat 22 is pivotally connected to a transverse upper rod element 69 of a U-shaped frame 70 about which the upper ends of the wire 29 are looped, by means of a pair of brackets 71 each having an upper looped portion 72 looped about the seat rod element 61 and the gate rod element 69, and a lower end portion 73 looped about the transverse rod 26.

The movement of the seat structure elements in arranging the seat structure selectively in the extended and collapsed arrangement is best seen by reference to FIGS. 3–5. Thus, in the extended arrangement, the seat 22 serves to hold the front panel in a slightly forwardly inclined position, with the weight of the front panel urging the front panel in a clockwise direction as seen in FIG. 3 about its pivotal connection to the cross rod 27. In this arrangement, the intermediate panel 21 may be selectively disposed in juxtaposition with the front panel 20 or with the gate 19. When the intermediate panel is juxtaposed to the front panel 20, the upper closure portion defined by the wires 53 and the transverse rod elements 52, 54, 55 and 56 is juxtaposed to the wires 42 of the front panel which define a seat back. To permit this juxtaposition, the width of the intermediate panel, as determined by the spacing between side rod elements 50, is slightly less than the width of the front panel as determined by the spacing between side rod elements 38. Further, the spacing of the lower cross rod 56 above the lower frame rod element 51 of the intermediate panel is greater than the spacing of the cross rod 45 above the lower rod element 39 of the front panel whereby clearance is had between the cross rod 56 and the seat 22 retained on the cross rod 48. Thus, the upper portion of the intermediate panel 21 reinforces the seat back portion of the front panel when juxtaposed thereto.

When it is desired to utilize the space 74 above seat 22 for holding small packages and the like, the intermediate panel may be swung in a counterclockwise direction as seen in FIG. 3 into juxtaposition with the rear gate 19. When thusly arranged, the wires 53 extend across and close the leg openings 31 precluding the loss of the small objects from the space 74. As the front panel 20 is inclined forwardly, and the rear gate is inclined rearwardly, the intermediate panel remains in juxtaposition to the selected one of the front panel or rear gate by virtue of the weight of the intermediate panel thereagainst. However, as the lower end of the intermediate panel is freely pivotally connected to the transverse rod 27, the intermediate panel may be readily swung to either of the alternative positions.

When it is desired to telescope a similar second cart with the cart 10, the second cart is urged forwardly against the rear gate 19 to urge the entire seat structure 18 to the dotted line position of FIG. 1. Whatever the arrangement of the various elements of the seat structure 18 might be prior to the engagement of the second cart therewith, as the seat structure is swung to the dotted line position, the elements become disposed in the arrangement illustrated in FIG. 5, wherein each of the rear gate 19, front panel 20, intermediate panel 21, and seat 22 are juxtaposed in parallel relationship. The nesting arrangement of the seat 22 and the intermediate panel 21 between the side rod elements 38 of the front panel 20 permits the seat structure to collapse to an extremely thin configuration. Thus, an increased capacity in the basket 15 is effected where it is desired to utilize the basket with the seat structure in the collapsed arrangement of FIG. 5, and a minimized upward extension of the seat structure is provided in the horizontal position thereof when the carts are telescoped providing increased clearance between the seat structure of one cart and the handle structure of the forwardly disposed cart.

Turning now to FIGS. 9 and 10, a modified seat structure 118 is shown to comprise a seat structure generally similar to seat structure 18 but having means carried on the upper rod element 140 of the front panel 120 for carrying desirable indicia. More specifically, a plate 180 is pivotally connected to upper rod element 140 by an integral turned flange 181. The plate 180 extends substantially the distance between the side rod elements 138 of the front panel 120 and downwardly from the upper rod element 140 to below the cross rod 144. Thus, the plate 180 serves as an upward extension of the seat back defined by the wires 142. Further, the distal end 182 of the flange 181 is downturned to define a downwardly opening channel 183 at the upper end of the plate, and the lower end of the plate is provided with an upturned flange 184 defining an upwardly opening channel 185 co-operating with channel 183 to retain a suitable information carrying card (not shown).

The forward side of plate 180, may similarly be arranged to carry an information bearing card, being provided with a downturned flange 186 at the upper end thereof and an upturned flange 187 at the lower end thereof for removably receiving a card.

The cross rods 143 and 144 are carried on the front side of the side rod elements 138 and, thus, when the plate 180 is disposed in the position of FIGS. 9 and 10 to rest against the cross rods 143 and 144, the plate is nested between the side rod elements providing an improved compact arrangement.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. In a cart, a seat structure comprising: a rear gate having a lower end, a support adjacent the lower end, and an upper end portion defining a pair of leg openings; a front panel having an upper portion defining a seat back, and a lower end; a seat having a rear end and a front end; an intermediate panel having an upper closure portion and a lower end; means pivotally connecting the lower end of the front panel and the lower end of the intermediate panel to said support of the rear gate adjacent said lower end whereby the intermediate panel may selectively be juxtaposed to the rear gate to dispose the closure portion across the leg openings to close the openings, and juxtaposed to the front panel to dispose the closure portion adjacent the seat back to reinforce the seat back; means pivotally connecting the rear end of the seat to the rear gate adjacent the bottom of the leg openings to extend through the intermediate panel below said closure portion thereof; means slidably connecting the front end of the seat to the front panel; and a support on the front panel limiting the forward pivoting of the seat to a substantially horizontal position.

2. In a cart, a seat structure comprising: a rear gate having a lower end and an upper portion defining a pair of leg openings; a front panel having an upper portion defining a seat back, and a lower end; a seat; an intermediate panel having an upper closure portion and a lower end; means pivotally connecting the lower end of the front panel to the rear gate adjacent said lower end; means pivotally connecting the lower end of the intermediate panel to said rear gate adjacent said lower end whereby the intermediate panel may selectively be juxtaposed to the rear gate to dispose the closure portion across the leg openings to close the openings, and juxtaposed to the front panel to dispose the closure portion adjacent the seat back to reinforce the seat back; and means connecting the seat to the rear gate and the front panel including structure supporting the seat selectively in a first position wherein the seat is substantially horizontal and a second position wherein the seat is substantially upright.

3. The seat structure of claim 2 wherein the rear gate is provided with a support adjacent the lower end, and the lower ends of the front and intermediate panels are connected to said support by said pivotally connecting means.

4. The seat structure of claim 2 wherein the means connecting the seat to the front panel includes a pair of elongated side elements each having a rearwardly offset portion laterally of the seat back, and the seat is provided with a pair of laterally projecting elements slidably engaging the forward surface of said offset portion.

5. The seat structure of claim 2 wherein the means connecting the seat to the front panel includes means forming a pair of laterally opening, vertically elongated channels at the opposite sides of the seat back and the seat includes means slidable in said channels to connect the front end of the seat to the front panel.

6. The seat structure of claim 2 wherein the means connecting the seat to the front panel includes a pair of elongated side elements, said seat back comprises a structure secured to the front of the side elements to lie forwardly of the side elements, and the intermediate panel is laterally narrower than the spacing between the side elements of the front panel permitting the intermediate panel to be nested between the side elements when the intermediate panel is juxtaposed to the front panel.

7. The seat structure of claim 2 wherein the rear gate includes a portion stopping the rearward movement of the closure portion of the intermediate panel substantially at a first plane containing the axis of the pivotal connection of the seat to the rear gate, and the means connecting the seat to the rear gate includes an offset adjacent the rear gate disposing the seat in a second plane substantially parallel to said first plane and immediately forwardly thereof when the intermediate panel is juxtaposed to the rear gate and the seat is pivoted rearwardly to be juxtaposed to the intermediate panel.

8. In a cart, a seat structure comprising: a rear gate having a lower end and an upper portion defining a pair of leg openings; a front panel having an upper portion defining a seat back, and a lower end; a seat having a rear end and a front end; an intermediate panel having an upper closure portion and a lower end; means pivotally connecting the lower end of the front panel to the rear gate adjacent said lower end; means pivotally connecting the lower end of the intermediate panel to said rear gate adjacent said lower end whereby the intermediate panel may selectively be juxtaposed to the rear gate to dispose the closure portion across the leg openings to close the openings, and juxtaposed to the front panel to dispose the closure portion adjacent the seat back to reinforce the seat back; means pivotally connecting the rear end of the seat to the rear gate adjacent the bottom of the leg openings to extend through the intermediate panel below said closure portion thereof; means movably connecting the front end of the seat to the front panel; and a support on the front panel limiting the downward movement of the front end of the seat to a position wherein the seat is substantially horizontal.

References Cited in the file of this patent

UNITED STATES PATENTS

| | | |
|---|---|---|
| 2,687,589 | Brockway | Aug. 31, 1954 |
| 2,860,885 | Schweitzer | Nov. 18, 1958 |
| 2,888,761 | Miller | June 2, 1959 |
| 2,891,801 | Sides | June 23, 1959 |
| 2,895,243 | Hummer et al. | July 21, 1959 |